United States Patent

[11] 3,578,025

| [72] | Inventor | Eduard Furrer<br>Zurich, Switzerland |
| --- | --- | --- |
| [21] | Appl. No. | 784,678 |
| [22] | Filed | Dec. 18, 1968 |
| [45] | Patented | May 11, 1971 |
| [73] | Assignee | Contraves AG<br>Zurich, Switzerland |
| [32] | Priority | Dec. 22, 1967 |
| [33] | | Switzerland |
| [31] | | 18131/67 |

[54] FLUID-CONTROLLED, IN PARTICULAR HYDRAULICALLY OR PNEUMATICALLY CONTROLLABLE SLIDE VALVE ARRANGEMENT
5 Claims, 1 Drawing Fig.

[52] U.S. Cl. .................................................... 137/625.66
[51] Int. Cl. ........................................................ F16k 11/07
[50] Field of Search ........................................... 137/625.66,
625.65 (Consulted), 625.69, 625.25, 625.67, 625.6; 91/308, 402; 251/23, 28, 55

[56] References Cited
UNITED STATES PATENTS
2,538,383   1/1951   Sandwell ...................... 251/28X
3,064,464  11/1962   Black et al. .................. 137/625.69X
3,253,515   5/1966   Wilkinson ..................... 91/402X

*Primary Examiner*—M. Cary Nelson
*Assistant Examiner*—Robert J. Miller
*Attorney*—Werner W. Kleeman ABSTRACT: There is disclosed a fluid-controlled slide valve arrangement, in particular a pneumatically or hydraulically controlled slide valve arrangement, for alternately connecting an outflow conduit with a pressure conduit and return flow conduit of a fluid-operating system. This slide valve arrangement embodies a sleeve valve member displaceably mounted in a slide valve housing, such sleeve valve member incorporating at one end a piston extension of larger diameter. Fluid-operated control means alternately apply a pneumatic or hydraulic overpressure to the end faces of the piston extension in order to displace the sleeve valve member. The pneumatic or hydraulic control overpressure is only maintained during a portion of the switching operation. Relief channel means provided at the slide valve arrangement communicate with the outside, whereby the control pressure drops during the latter part of the switching operation as soon as the relief channel means are freed by the enlarged piston extension.

PATENTED MAY 11 1971  3,578,025
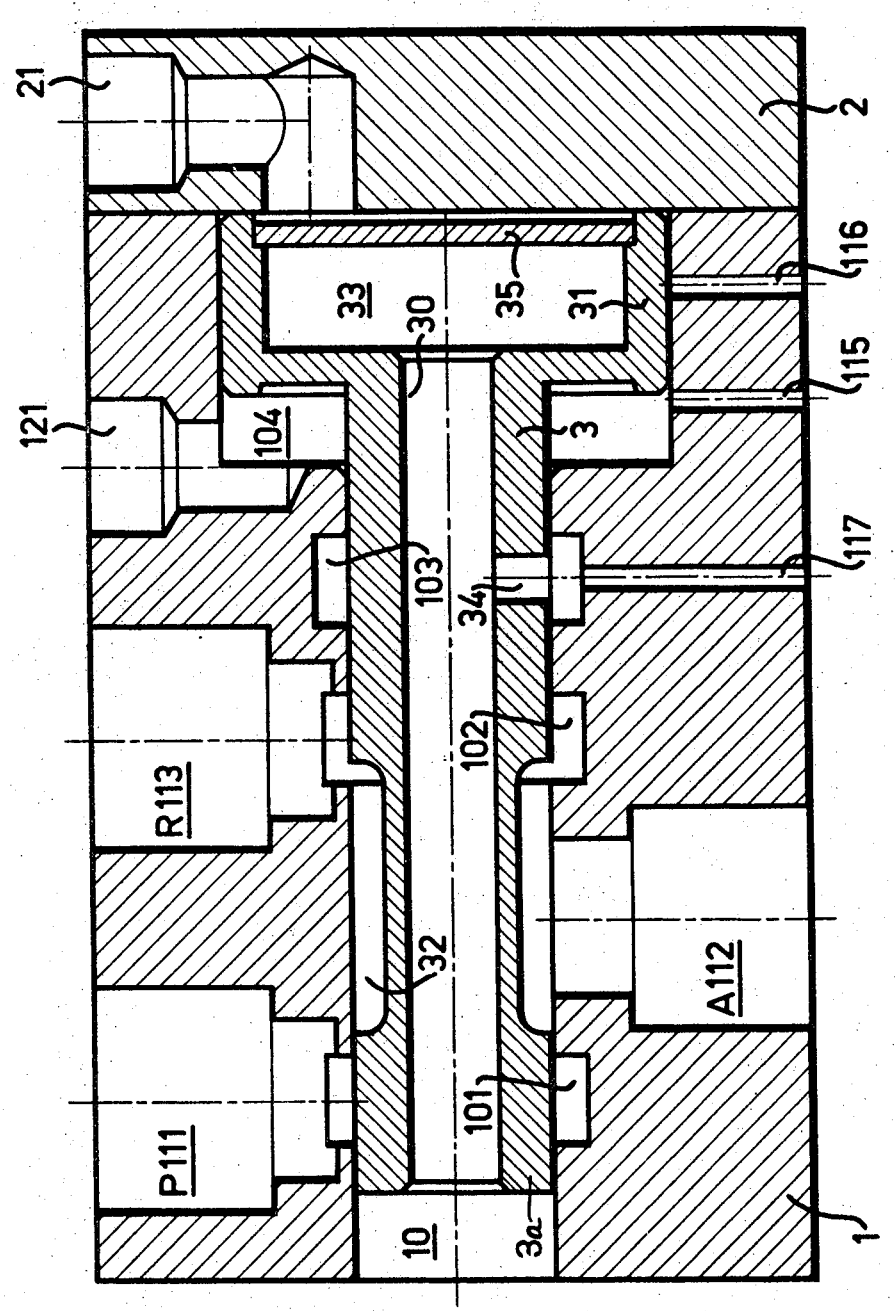
INVENTOR,
EDUARD FURRER
BY Jackie & Davidson
ATTORNEYS

FLUID-CONTROLLED, IN PARTICULAR HYDRAULICALLY OR PNEUMATICALLY CONTROLLABLE SLIDE VALVE ARRANGEMENT

BACKGROUND OF THE INVENTION

The present invention relates to an improved fluid-controlled slide valve arrangement for alternately connecting an outflow conduit with the pressure conduit and the return flow conduit of a fluid-operating system. The inventive slide valve arrangement is of the type incorporating a sleeve valve member, at one end of which there is located a piston extension of larger diameter, wherein the end faces of such larger diameter piston extension are alternately subjected to a pneumatic or hydraulic overpressure by means of pneumatic or hydraulic control means.

Slide valve arrangements of this type are utilized for controlling fluid systems which operate under high pressures by means of a control fluid medium which is at a lower pressure.

If the working fluid medium and the control fluid medium are not formed of the same material, then a mutual sealing of the work and control fluid mediums, respectively, is necessary. A good sealing arrangement for the sleeve valve member results in increased friction. This, in turn, requires increased control pressures in order to attain short switching times. With the prior art slide valve arrangements it was not possible to obtain short switching times with low control pressure.

SUMMARY OF THE INVENTION

Accordingly, a primary objective of the present invention is directed to the provision of an improved fluid-controlled slide valve arrangement which reliably and effectively satisfies the aforementioned purposes.

Another, more precise object of this invention deals with the provision of an improved fluid-controlled, more specifically, hydraulically or pneumatically controlled, slide valve arrangement, which is quite simple in construction, yet extremely reliable in operation, not readily subject to breakdown, therefore requiring minimum maintenance and servicing, and also, possesses the attribute that it is economical from the standpoint of manufacturing requirements.

Now, in order to implement these and still further objects of the invention, which will become readily apparent as the description proceeds, the proposed inventive hydraulically or pneumatically controlled slide valve arrangement is manifested by the features that the pneumatic or hydraulic control pressure is only maintained during a portion of the switching phase or time, and that there are provided relief channel means leading towards the outside which ensure that the control pressure drops during the latter portion of the switching phase as soon as these relief channels are freed by the enlarged piston extension.

Slide valve arrangements of this type do not require any special sealing members at the sleeve valve member, because working fluid medium which might collect at the widened chamber portion provided for the enlarged piston extension can escape via the relief channels. Owing to the low friction of the sleeve valve member in its bore or compartment it is possible to attain short switching times with low control pressures.

Preferably a ring or annular groove can be provided between the working portion and the control portion of the slide valve arrangement at the compartment or bore in which the sleeve valve member is situated. A throughpassage opening communicates with this annular groove. Consequently, there is achieved a still better separation of the working fluid medium and the control fluid medium.

BRIEF DESCRIPTION OF THE DRAWINGS

The invention will be better understood and objects other than those set forth above, will become apparent when consideration is given to the following detailed description thereof. Such description makes reference to the annexed drawing wherein the single FIG. shows in longitudinal sectional view a preferred embodiment of inventive slide valve arrangement.

DESCRIPTION OF THE PREFERRED EMBODIMENT

Describing now the exemplary embodiment of inventive slide valve arrangement depicted in the drawing, it will be seen that such embodies a slide valve housing 1 possessing an axially extending bore or compartment 10 which, in turn, is provided with the annular or ring-shaped grooves 101, 102, 103, as well as the widened or enlarged chamber or compartment portion 104. Slidably arranged within the bore or compartment 10 is a sleeve valve or slide valve piston member 3 which includes a piston head or extension 31 of larger diameter than the body 3a of the sleeve valve 3. This enlarged diameter piston extension or head 31 is received in the widened or enlarged chamber portion 104 of the bore 10. Furthermore, it will be recognized that relief channels 115 and 116 communicate in flow relationship with the enlarged chamber portion 104, as shown.

Continuing, the slide valve housing 1 will be further seen to include a working region which contains a pressure conduit or connection P111, an outflow conduit or connection A112 and the return flow conduit or connection R113, all of which flow communicate with the axially extending bore 10, again as clearly shown in the drawing. The invention further contemplates the provision of fluid-operated control means for alternately applying a pneumatic or hydraulic overpressure to the opposed end faces of the enlarged diameter piston extension or head 31 in order to selectively displace the sleeve valve member 3. In the exemplary embodiment, it will be recognized that such fluid-operated control means includes a control conduit or connection 121 which is provided at the slide valve housing 1 and communicates with the enlarged chamber 104 and transmits the overpressure of a control fluid medium to the confronting end face of the enlarged diameter piston portion 31. Additionally, such control means embodies a further control connection or conduit 21 which is provided at a cover member 2 which is tightly or sealingly mounted at the slide valve housing 1. This control conduit 21 communicates with the opposite end face of the piston head or portion 31, to thus apply thereto the overpressure of the control fluid medium.

Furthermore, it will be recognized that the sleeve valve or slide valve piston member 3 containing the enlarged piston head or portion 31 and slidably accommodated in the bore 10 including its enlarged chamber 104, further possesses an annular groove 32 which is formed by providing a reduced portion at the body 3a of the sleeve valve member 3. The sleeve valve member 3 is internally provided with an axially extending bore 30 which includes a widened or enlarged bore or compartment 33 provided at the piston extension 31. The provision of the intercommunicating bores 30 and 33 at the sleeve valve member 3 primarily serves to reduce the weight thereof. A port or throughpassage opening 34 flow communicates the internal bore 30 of the sleeve valve 3 and its widened bore 33 at the piston extension 31 with the annular groove 103 provided at the slide valve housing 1. A cover member 35 obturates the bore 30 and its widened bore portion 33, simultaneously providing an operable end face for the pressure of the control fluid medium applied through the control connection or conduit 21.

In the illustrated position of the previously described components the annular groove 32 communicates the outflow conduit A112 with the return flow conduit R113. A control impulse applied pneumatically or hydraulically by means of the control connection 21 results in displacement of the sleeve valve or piston member 3 towards the left until it abuts against a suitable stop or end wall of the slide valve housing 1. In so doing, the outflow conduit A112 is flow connected via the annular groove 32 with the pressure conduit P111. On the other hand, a pneumatic or hydraulic control impulse delivered via the control conduit or connection 121 returns the sleeve valve member 3 back into its initial or starting position. Any pneumatic or hydraulic leakage working fluid medium which tends to collect in the axially extending bore 10 externally of the piston unit is conducted away via the throughpassage opening 34, the annular groove 103, and the leakage medium discharge channel 117 and via the relief channels 115 and 116, respectively. Furthermore, it should be recognized that the inventive construction of slide valve arrangement provides for the existence of the hydraulic or pneumatic control pressure only during a portion of the switching phase or time, and the relief channel means 115 and 116 communicating with the outside or surroundings ensure that this control pressure drops during the latter portion of the switching phase as soon as such relief channel means are freed by the enlarged piston extension.

Finally, it is mentioned that the discharge channel 117 for the leakage fluid medium, which is shown to communicate in flow relationship with the annular groove 103, in the exemplary embodiment shown, is situated between the aforementioned working region of the slide valve housing 1 containing the conduits P111, R113, and A112 for the working fluid medium and the enlarged piston head 31.

A slide valve arrangement of the described type, without special sealing members provided at the control sleeve valve 3 can be used, for instance, with a pneumatic control pressure system, to control a hydraulic high-pressure oil system of, for instance, 180 atmospheres excess pressure. Also, with very low pneumatic pressures of the order of magnitude of one-third atmospheric excess pressure, such as is delivered for example by a fluidics system, it is possible to achieve very short switching times of 5—20 ms.

Furthermore, the relief channels 115 and 116 provide the further advantage that the leakage working fluid medium which emanates from the high-pressure system and which could collect in the widened or enlarged chamber portion 104, is continuously blown out by the pneumatic control fluid medium. During the switching operation the danger is additionally eliminated that leakage fluid medium will be blown back through one of the control conduits or connections 121 or 21, respectively, back into the fluidics system.

It should be apparent from the foregoing detailed description, that the objects set forth at the outset to the specification have been successfully achieved.

I claim:

1. A fluid-controlled slide valve arrangement, in particular a pneumatically or hydraulically controlled slide valve arrangement, for alternately connecting an outflow conduit with a pressure conduit and return flow conduit of a fluid-operating system, comprising a slide valve housing, a sleeve valve member displaceably mounted in said slide valve housing, said sleeve valve member incorporating at one end a piston extension of larger diameter, said larger diameter piston extension possessing opposed end faces, fluid-operated control means for alternately applying a pneumatic or hydraulic control overpressure to said end faces of said piston extension in order to displace said sleeve valve member during the switching operation, said pneumatic or hydraulic control overpressure only being maintained during a portion of the switching operation, relief channel means provided for said valve arrangement, said relief channel means provided for said valve arrangement, said relief channel means communicating with the outside, said control pressure dropping during the latter part of said switching operation as soon as any of said relief channel means are freed by said enlarged piston extension, said slide valve housing incorporating a working portion provided with said outflow conduit, said pressure conduit and return flow conduit, a discharge channel for leakage fluid medium, said slide valve housing being provided with internal groove means communicating in flow relationship with said discharge channel, said internal groove means being disposed between said working portion of said slide valve housing and said larger diameter piston extension.

2. A fluid-controlled slide valve arrangement, in particular a pneumatically or hydraulically controlled slide valve arrangement, for alternately connecting in flow relationship an outflow conduit with a pressure conduit and return flow conduit for a working fluid medium of a fluid-operating system, comprising a slide valve housing, a sleeve valve member incorporating a sleeve body displaceably mounted in said slide valve housing, said sleeve valve member being devoid of any sealing means between said sleeve body and said slide valve housing to reduce frictional forces therebetween, to thus permit more rapid displacement movements of said sleeve valve member, said sleeve valve member further incorporating at one end a piston extension of larger diameter, said larger diameter piston extension possessing opposed end faces, a fluid-operated control means for alternately applying a pneumatic or hydraulic control overpressure to said end faces of said piston extension in order to selectively displace said sleeve valve member during the switching operation, said pneumatic or hydraulic control overpressure only being maintained during a portion of the switching operation, at least one relief channel means provided for said valve arrangement, said relief channel means communicating with the outside, said control pressure dropping during the latter part of said switching operation as soon as said relief channel means is freed by said enlarged piston extension, said relief channel means, when freed, further serving to vent any leakage working fluid medium which may have seeped between said sleeve body of said sleeve valve member and said slide valve housing into the region of said larger diameter piston extension, to thus prevent said leakage working fluid medium from flowing into said fluid-operated control means and fouling operation thereof.

3. A fluid-controlled, in particular a pneumatically or hydraulically controllable slide valve arrangement as defined in claim 2, wherein said fluid-operated control means incorporates respective control conduit means for alternate application of said pneumatic or hydraulic control overpressure to the end faces of said piston extension in order to displace the sleeve valve member.

4. A fluid-controlled slide valve arrangement as defined in claim 2, wherein there are provided two relief channel means each one of which is disposed in operable relationship with respect to each respective end face of said larger diameter piston extension.

5. A fluid-controlled slide valve arrangement as defined in claim 2, wherein said sleeve body and said larger diameter piston extension are each internally hollow for the purpose of reducing the weight of said sleeve valve member to permit more rapid displacement thereof.